United States Statutory Invention Registration [19]

[11] Reg. Number: H865

Sery et al. [43] Published: Jan. 1, 1991

[54] APPARATUS FOR ATTACHING ORDNANCE TO BARRIER TARGETS

[75] Inventors: Robert S. Sery, Silver Spring; Alexander G. Rozner, Potomac; James C. Waldron, Silver Spring; William R. Walton, Clarksville, all of Md.

[73] Assignee: The United States of America as represented by the Secretary of the Navy, Washington, D.C.

[21] Appl. No.: 825,706

[22] Filed: Nov. 13, 1985

[51] Int. Cl.[5] ..... F42B 1/02

[52] U.S. Cl. ..... 102/306; 86/50; 102/293; 102/473; 248/206.5

*Primary Examiner*—Harold J. Tudor

*Attorney, Agent, or Firm*—Robert F. Beers; Kenneth E. Walden

[57] ABSTRACT

The invention is directed to a Pyronol torch and holder device for providing quick and efficient attachment of the torch to a barrier target (flat, curved, or irregular shape) that is made of steel or magnetic steel alloys. The device provides for attachment to the target and for holding a cutting torch containing pyrotechnic material at a predetermined standoff distance from the surface of the target for proper operation of the torch and for permitting escape of products of combustion to minimize liftoff forces on the holding device tending to lift it from the target to which it is attached.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR ATTACHING ORDNANCE TO BARRIER TARGETS

BACKGROUND OF THE INVENTION

The use of the pyronol torch against various types of steel targets was implemented previously by using various mechanical means, including the application of manual force by the person using it. A need arose for means for securely attaching torches to steel targets in a quick manner. The use of a holder employing magnets is proposed herein to (1) keep the torch firmly fastened to the target yet with sufficient standoff distance of the torch from the target to insure complete perforation, (2) be easily attached, and (3) remain in place after firing. Mechanical devices have been employed to both hold the torch to a barrier and maintain it at a prescribed standoff distance.

The invention relates generally to a pyronol torch and a device for holding the torch in proper position with respect to the surface of a barrier target for cutting penetration or destruction of the target. More specifically, the invention relates to a holder for securing a torch generally normal to the surface of a barrier target at a preselected standoff distance therefrom for allowing cutting operation and escape of the combustion gases which would otherwise tend to lift the device from the target.

Pyronol torch devices contain a power source of pyrotechnic material "pyronol". Pyronol is a powder mixture of nickel, aluminum, ferric oxide and fluorcarbon (teflon) which is pelletized into a cylinderical configuration. After initiation, exothermic reaction takes place inside the torch chamber, and molten products of the reaction are ejected in the form of a jet at high velocity by internally generated gas pressure through a graphite nozzle. The jet from the chamber, when directed against a target barrier, at a preselected standoff distance, causes extensive erosion of the target which can lead to the perforation in a very short time.

Such torches have use, particularly military use, for penetrating barriers such as wall, bars, or doors, usually made of steel, for permitting entry or egress. Such torches and holding devices also have use for rupturing steel fuel storage tanks and igniting its contents. The invention includes a torch holder which is adapted to receive the torch in a preselected position and for quickly and efficiently securing it to the barrier. For attachment to relatively flat surfaces of steel or magnetic material, the device or holder is constructed in the form of an H-frame having spaced-apart magnets for holding against the barrier and a support ring for retaining the torch in fixed position relative thereto. Another embodiment of the invention pertains to holding a torch in proper position with respect to a steel bar for cutting it.

SUMMARY OF THE INVENTION

In summary, there are provided devices for holding pyronol torches in spaced vertical position normal to a target such as a wall or rod of steel. The devices are adapted to be quickly attached to the barrier target and to overcome liftoff forces from the target by the torch when ignited.

It is, therefore, an object of the invention to provide an arrangement for holding a pyrotechnic torch in position adjacent to a barrier target.

It is another object of the invention to provide a device with spaced apart magnetic feet for attachment to a steel or magnetic steel alloy barrier target and for holding a pyrotechnic torch body at predetermined spacing in front of the target.

It is still another object of the invention to provide a device for mechanical attachment to a steel rod for holding a pyrotechnic torch at a prescribed position and distance therefrom for penetrating or destructing the rod.

BRIEF DESCRIPTION OF THE DRAWINGS

The previously stated objectives, features, and advantages of the invention will be more apparent from the description in the specification when considered in conjunction with the accompanying drawings.

DETAILED DESCRIPTION OF THE PREFERRED EMBODIMENTS

Figure 1:
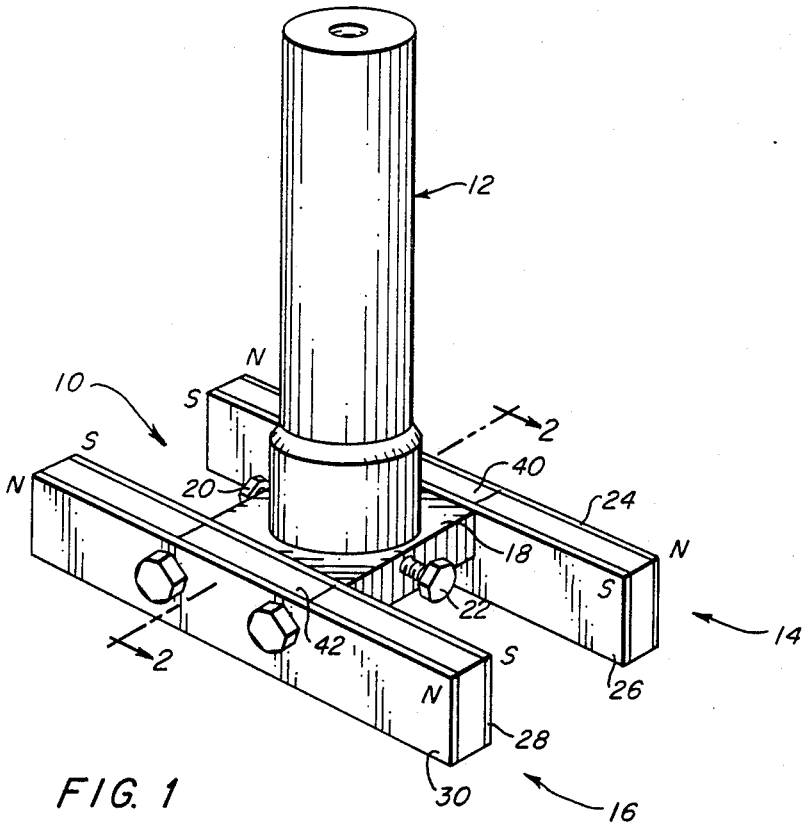
FIG. 1 is a perspective view of the holder device showing a torch retained therein.
Figure 2:
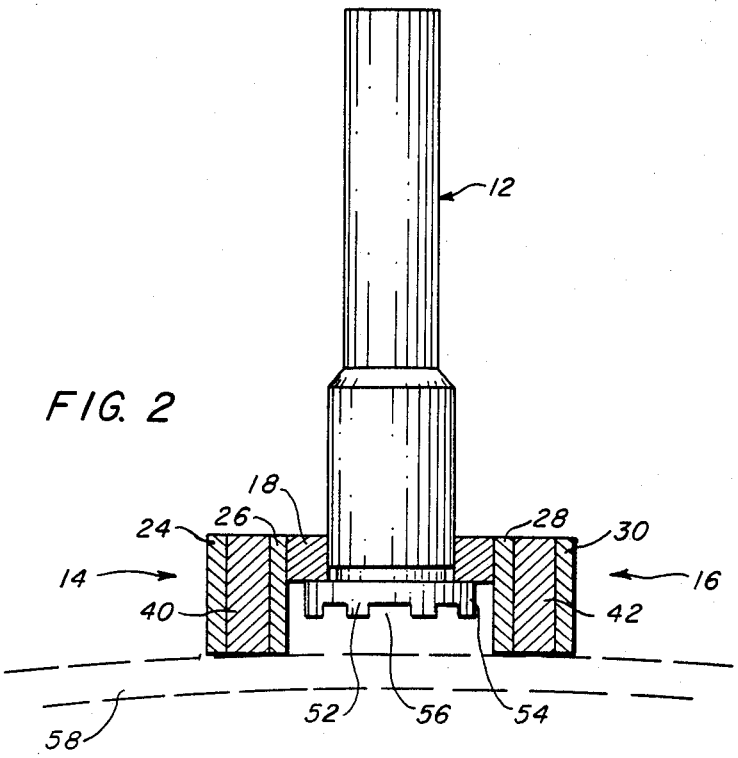
FIG. 2 is a cross-sectional view of the holder device taken along line 2—2 of FIG. 1 illustrating the pyrotechnic torch in position in front of a barrier target shown in phantom.

Referring now to the drawings, there is illustrated in FIGS. 1 and 2 one embodiment of the invention for attaching a pyrotechnic torch to a relatively flat steel barrier. FIG. 1 is a plan view of attaching device 10 which is in the form of an H-frame. It receives pyrotechnic torch 12. FIG. 2 is a cross-sectional view taken along line 2—2 of FIG. 1. The H-frame includes a pair of bars 14 and 16 spaced apart on opposite sides of non-magnetic block 18. A hole extends through block 18, and is of a size to provide a loose fit for the cylindrical casing of torch 12 which may be inserted from the bottom face thereof. Set screws 20 and 22 are for locking the torch casing in fixed position in block 18.

Spaced bars 14 and 16 comprise flat steel bars 24, 26, 28 and 30, respectively, which sandwich therebetween ceramic magnets 32, 34, 36 and 38, separated by non-magnetic spacing bars 40 and 42. Epoxy cement may be used to bond the magnets to steel bars 14 and 16 and to fill any residual spaces. Cap screws 44, 46, 48 and 50 secure bars 14 and 16 to block 18. These screws may be left loose to aid in allowing spaced bars to pivot to settle on a barrier target which is not planar, and yet hold the frame together during firing of the torch. A single screw may be employed instead on each side which would allow even more pivotal movement of bars 14 and 16. Each magnet is magnetized through its thickness and both magnets on a single bar have the same orientation, but opposite to that on the other bar. When the frame is placed on a magnetic target surface, the magnetic circuit is completed through each bar end. This provides a strong magnetic holding force.

The frame making up device 10 may take other shapes. It may use a different number of magnets arranged in a different footing arrangement, for example, three which would tend to rest easily on uneven surfaces.

Torch 12, as illustrated in FIG. 2, comprises a cylindrical casing filled with pyrotechnic material. A graphite nozzle (not illustrated) is provided in one end of the casing for directing passage of a jet of molten material for penetrating a barrier. A head 52 has an enlarged annular form defining an annular shoulder 54 which bears against block 18 of the H-frame. A skirt portion of head 52 is provided with radially extending ports 56 for allowing passage of gaseous products of combusion from the pyrotechnic material.

Annular shoulder 54 is adjustable axially and is adapted to abut against block 18 for positioning. As illustrated, the end of the casing is spaced a predetermined standoff distance in front of a barrier, such as barrier 58 illustrated in phantom. The standoff distance and slots 56 provide for lateral dispersion of combustion gases from the torch pyrotechnic material ignition or firing to minimize liftoff forces applied to the frame tending to lift it from the target.

The embodiment of the holder for positioning a torch relative to targets has been described hereinabove for the objectives set forth and principles involved. It will be apparent, however, that deviations may be made from the embodiment disclosed and illustrated without departing from the spirit of the invention as claimed.

We claim:

1. A barrier penetrator and holder therefor comprising:

a torch including an elongate cylinder casing containing pyrotechnic composition adapted upon activation to discharge an axially directed high velocity jet of high temperature molten composition for penetrating a barrier;

said elongate cylindrical casing including an annular shoulder means; and, holder means including means for receiving the cylindrical casing and engaging the annular shoulder means for holding the casing substantially vertical to the surface of the barrier and at a preselected standoff distance from the surface of the barrier for effective jet penetration;

whereby generated pressurized gases exiting the torch are allowed to escape laterally along the standoff distance adjacent the face of the barrier to minimize liftoff exterted on the frame.

2. The invention according to claim 1 further defined by spaced apart magnets carried on the frame means for defining means for holding the casing at a preselected standoff distance from the surface of the barrier.

3. The invention according to claim 1 further defined by means for adjusting the standoff distance of one end of the torch from the barrier.

4. The invention according to claim 1 further defined by the means for holding the casing on the barrier comprising a cylindrical sleeve having an L-shaped slot adapted to be received around a round bar when the bar defines the barrier.

* * * * *